(12) United States Patent
Kim et al.

(10) Patent No.: US 12,543,115 B2
(45) Date of Patent: Feb. 3, 2026

(54) METHOD AND APPARATUS FOR PERFORMING SENSING IN WIRELESS LAN SYSTEM

(71) Applicant: LG Electronics Inc., Seoul (KR)

(72) Inventors: Sanggook Kim, Seoul (KR); Dongguk Lim, Seoul (KR); Insun Jang, Seoul (KR); Jeongki Kim, Seoul (KR); Jinsoo Choi, Seoul (KR)

(73) Assignee: LG Electronics Inc., Seoul (KR)

(*) Notice: Subject to any disclaimer, the term of this patent is extended or adjusted under 35 U.S.C. 154(b) by 441 days.

(21) Appl. No.: 18/010,673

(22) PCT Filed: Jun. 15, 2021

(86) PCT No.: PCT/KR2021/007467
§ 371 (c)(1),
(2) Date: Dec. 15, 2022

(87) PCT Pub. No.: WO2021/256828
PCT Pub. Date: Dec. 23, 2021

(65) Prior Publication Data
US 2023/0319719 A1 Oct. 5, 2023

Related U.S. Application Data

(60) Provisional application No. 63/039,425, filed on Jun. 15, 2020.

(51) Int. Cl.
*H04W 52/02* (2009.01)
*H04W 84/12* (2009.01)

(52) U.S. Cl.
CPC ........ *H04W 52/0235* (2013.01); *H04W 84/12* (2013.01)

(58) Field of Classification Search
CPC . H04W 52/0235; H04W 84/12; H04W 52/02; Y02D 30/70; G01S 13/82; H04B 17/24; H04B 17/309
See application file for complete search history.

(56) References Cited

U.S. PATENT DOCUMENTS

| | | | |
|---|---|---|---|
| 2011/0199946 A1* | 8/2011 | Breit | H04L 25/03343 455/226.1 |
| 2014/0177501 A1* | 6/2014 | Seok | H04W 52/0241 370/311 |

(Continued)

FOREIGN PATENT DOCUMENTS

WO WO2018204793 11/2018

OTHER PUBLICATIONS

Chen et al., "WLAN Sensing Definitions," IEEE 802.11-20/0807r1, May 2020, 12 pages.

(Continued)

*Primary Examiner* — Rina C Pancholi
(74) *Attorney, Agent, or Firm* — Fish & Richardson P.C.

(57) ABSTRACT

In a wireless local area network (WLAN) system, a transmitting STA may transmit wake-up time information related to a receiving STA to the receiving STA. The transmitting STA may transmit a sensing start frame to the receiving STA during a wake-up time. The transmitting STA may transmit a sensing frame to the receiving STA. The transmitting STA may transmit a feedback requesting frame for the sensing frame to the receiving STA. The transmitting STA may receive a feedback frame for the sensing frame from the receiving STA. The wake-up time information may include duration information for maintaining an awake state in which the receiving STA can monitor a signal received from the transmitting STA, and period information for transitioning to the awake state.

8 Claims, 26 Drawing Sheets

(56) References Cited

U.S. PATENT DOCUMENTS

2018/0331749 A1   11/2018  Ghosh
2020/0059808 A1    2/2020  Lim et al.
2020/0196241 A1*  6/2020  Lou .................. H04W 52/0229

OTHER PUBLICATIONS

Silva, "A Channel Measurement Procedure for WLAN Sensing," IEEE 802.11-20/0842r0, Jun. 2020, 14 pages.

* cited by examiner (a)

(b)

METHOD AND APPARATUS FOR PERFORMING SENSING IN WIRELESS LAN SYSTEM

CROSS-REFERENCE TO RELATED APPLICATIONS

This application is a National Stage application under 35 U.S.C. § 371 of International Application No. PCT/KR2021/007467, filed on Jun. 15, 2021, which claims the benefit of U.S. Provisional Application No. 63/039,425, filed on Jun. 15, 2020. The disclosures of the prior applications are incorporated by reference in their entirety.

TECHNICAL FIELD

The present specification relates to a technique for performing sensing in a WLAN system, and more particularly, to a procedure and a signaling method for performing sensing by a sensing initiator station (STA) and a sensing responder STA.

BACKGROUND

A wireless local area network (WLAN) has been improved in various ways. For example, IEEE 802.11bf WLAN sensing is a first standard in which communication and radar technologies are integrated. Although the demand for unlicensed frequency is increasing in our daily lives and throughout the overall industry, since there are limitations in new (or fresh) supply of frequency, the communication-radar integration technology is a highly preferable orientation in the aspect of increasing efficiency in the usage of frequency. Although a sensing technology for detecting movement (or motion) behind walls by using WLAN signals, or a radar technology for detecting movement (or motion) inside a vehicle by using Frequency Modulated Continuous Wave (FMCW) signals (for example, at a 60 GHz band) are already under development, upgrading the sensing capability to a higher level by associating the current technology with the IEEE 802.11bf standardization has great significance. Most particularly, in modern society, the importance of privacy protection is becoming more emphasized. Therefore, unlike CCTVs, since the WLAN sensing technology in known to cause less legal issues related to privacy invasion, the development of WLAN sensing technology is anticipated.

Meanwhile, the overall radar market is expected to show an average annual growth of approximately 5% up to year 2025 throughout the automobile industry, national defense, industry, daily life, and so on. And, most particularly, in case of sensors used in daily life, the average annual growth is expected to mark an outstanding increase of up to 70%. The wireless LAN (WLAN) sensing technology may be extensively applied in our everyday lives so as to provide functions, such as motion detection (or recognition), respiration monitoring, positioning/tracking, falling detection, detecting presence of children in cars, emergence/proximity recognition, individual identification, bodily motion (or movement) recognition, gesture recognition, and so on. Thus, the growth of related new businesses may be promoted, and, accordingly, corporate competitiveness is expected to be improved.

SUMMARY

According to various embodiments, in a wireless local area network (WLAN) system, a transmitting STA may transmit wake-up time information related to a receiving STA to the receiving STA. The transmitting STA may transmit a sensing initiation frame to the receiving STA. The transmitting STA may transmit a sensing frame to the receiving STA. The transmitting STA may transmit a feedback requesting frame for the sensing frame to the receiving STA. The transmitting STA may receive a feedback frame for the sensing frame from the receiving STA. The wake-up time information may include duration information for maintaining an awake state in which the receiving STA can monitor a signal received from the transmitting STA, and period information for transitioning to the awake state.

According to an example of the present specification, power consumption can be reduced by instructing transmission suitable for characteristics of a WLAN sensing device. WLAN sensing may cause additional power consumption in addition to conventional data transmission. Using at least one method described in this specification, it is possible to reduce power loss that can be consumed by WLAN sensing. In addition, this specification includes various WLAN sensing methods that can be performed in conjunction with the proposed method.

According to an example of the present specification, since sensing can be performed even during a power-saving operation, and devices performing sensing can also enter a power-saving mode, there is the effect of saving power.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11ad standard or the IEEE 802.11ay standard. In addition, the present specification may also be applied to the newly proposed EHT standard or IEEE 802.11bf standard.

Hereinafter, in order to describe a technical feature of the present specification, a technical feature applicable to the present specification will be described.

Figure 1:
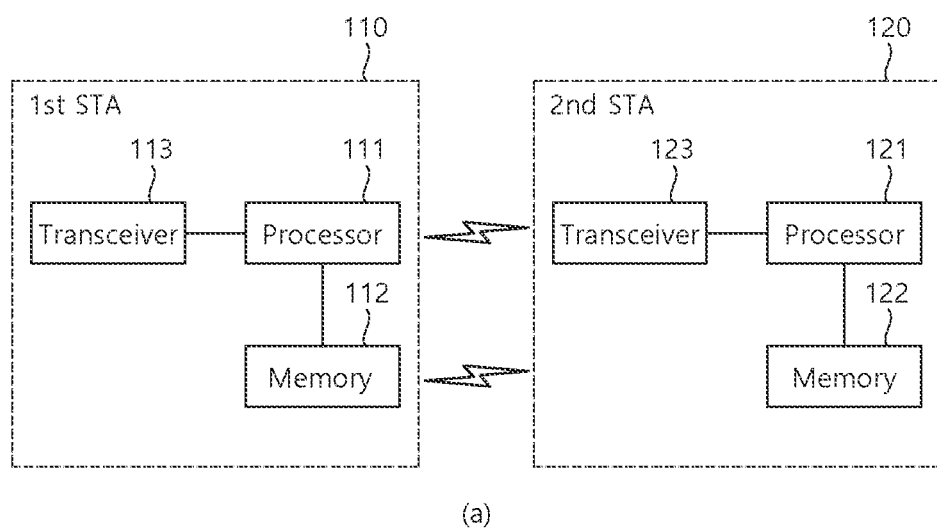
FIG. 1 illustrates an example of a transmitting apparatus and/or receiving apparatus of the present specification.
Figure 1:
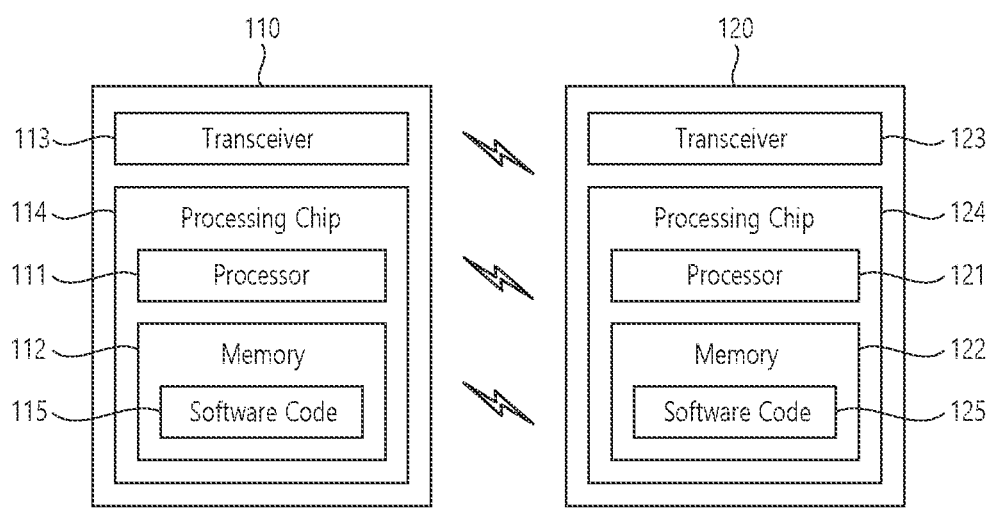

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power-saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to sub-figure (b) of FIG. 1, software codes 115 and 125 may be included in the memories 112 and 122. The software codes 115 and 126 may include instructions for controlling the operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit, and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Although a WLAN sensing technology is a type of radar technology that can be implemented without any standard, by standardizing the WLAN sensing technology, more powerful performance is expected to be gained. In the IEEE 802.11bf standard, devices that participate in WLAN sensing are defined per function as shown below in the following table. In accordance with the functions, the devices may be classified as a device that initiates WLAN sensing, a device that participates in WLAN sensing, a device that transmits a sensing Physical Layer Protocol Data Unit (PPDU), a device that receives a sensing PPDU, and so on.

TABLE 1

| Terms | Functions |
| --- | --- |
| Sensing Initiator | Device that initiates sensing |
| Sensing Responder | Device that participates in sensing |
| Sensing Transmitter | Device that transmits a sensing PPDU |
| Sensing Receiver | Device that receives a sensing PPDU |

Figure 2:
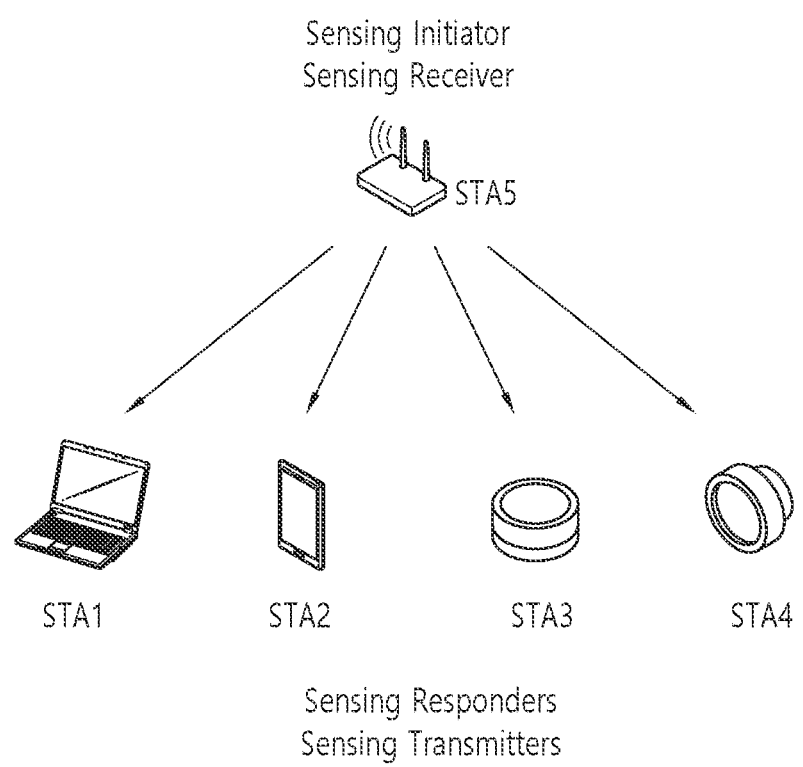
FIG. 2 illustrates an example of a WLAN sensing scenario using multiple sensing transmitting apparatuses.
Figure 3:
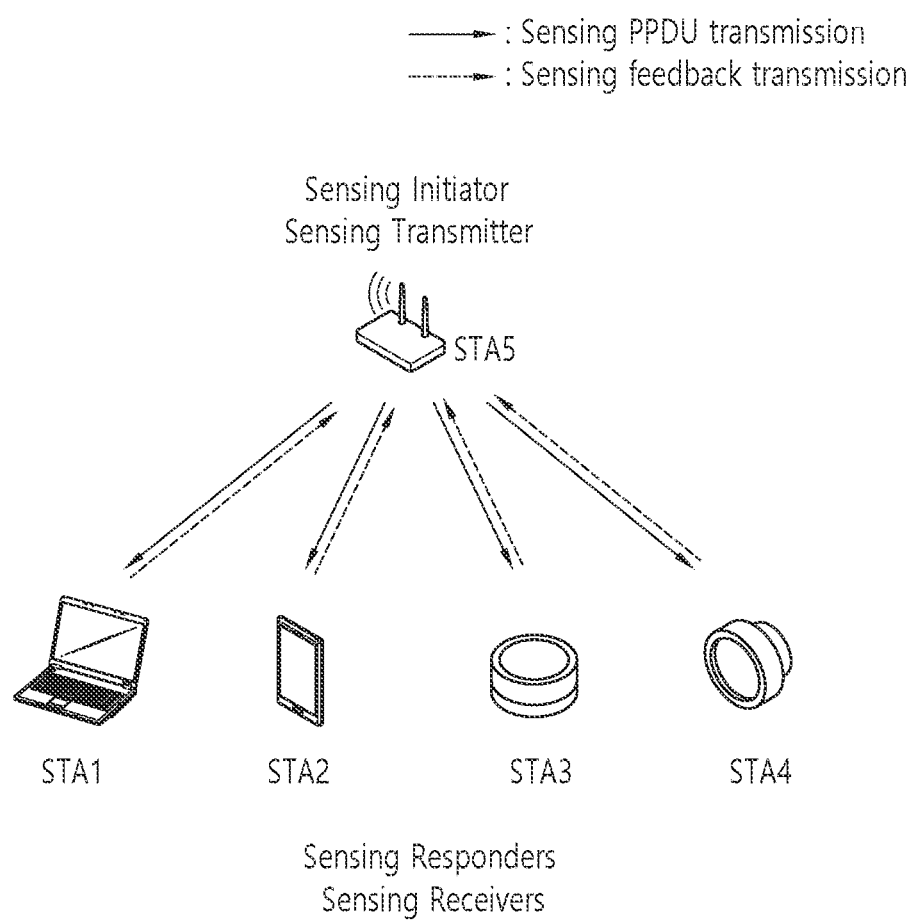
FIG. 3 illustrates an example of a WLAN sensing scenario using multiple sensing receiving apparatuses.
Figure 4:
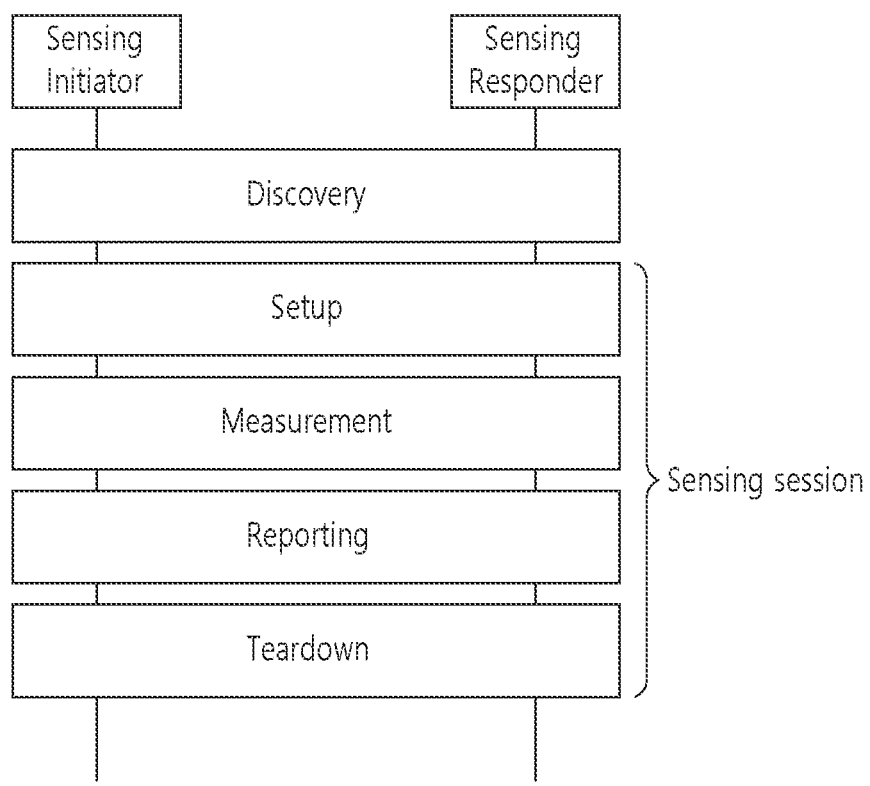
FIG. 4 illustrates an example of a WLAN sensing procedure.

FIG. 2 illustrates an example of a WLAN sensing scenario using multiple sensing transmitting apparatuses. FIG. 3 illustrates an example of a WLAN sensing scenario using multiple sensing receiving apparatuses. FIG. 2 and FIG. 3 illustrate a sensing scenario based on a function and deployment of a WLAN sensing apparatus. In an environment assuming one sensing initiation apparatus and multiple sensing participating apparatuses, FIG. 2 is a scenario using multiple sensing PPDU transmitting apparatuses, and FIG. 3 is a scenario using multiple sensing PPDU receiving apparatuses. Assuming that the sensing PPDU receiving apparatus includes a sensing measurement signal processing apparatus, in the case of FIG. 3, a procedure for transmitting (feeding back) a sensing measurement result to the sensing initiation apparatus (STA 5) is additionally required. FIG. 4 illustrates an example of a WLAN sensing procedure.

A procedure of WLAN sensing is performed as discovery, negotiation, measurement exchange, tear down, or the like between the WLAN sensing initiation apparatus and participating apparatuses. The discovery is a process of identifying the sensing capability of WLAN apparatuses. The negotiation is a process of determining a sensing parameter between the sensing initiation apparatus and participating apparatus. The measurement exchange is a process of transmitting a sensing PPDU and transmitting a sensing measurement result. The tear-down is a process of terminating the sensing procedure.

Figure 5:
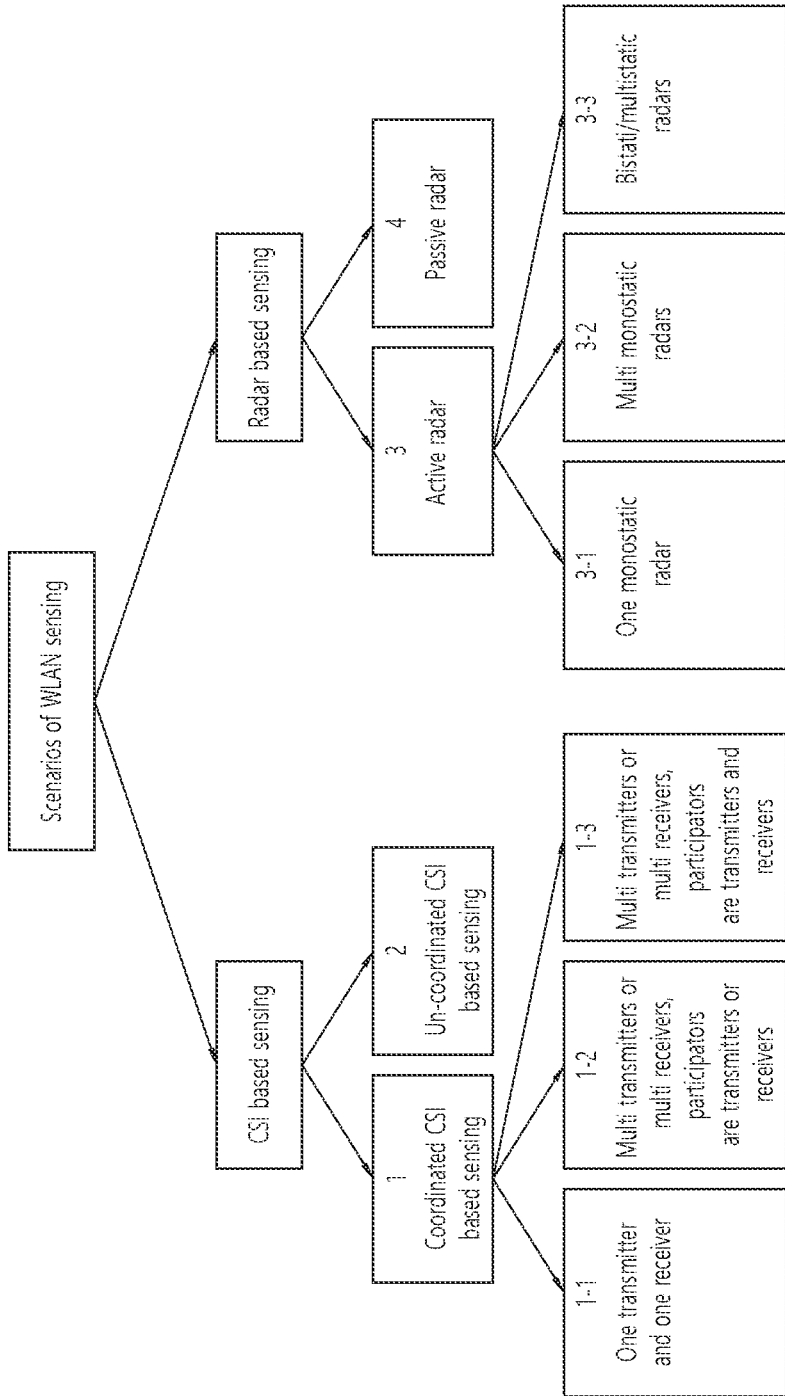
FIG. 5 is an example of classifying WLAN sensing.

FIG. 5 is an example of classifying WLAN sensing.

The WLAN sensing may be classified into CSI-based sensing which uses the channel state information of a signal arrived at a receiver through a channel and radar-based sensing which uses a signal received after a transmission signal is reflected by an object. In addition, each sensing technology is classified again into a scheme (a coordinated CSI, active radar) in which a sensing transmitter directly participates in a sensing process and a scheme (un-coordinated CSI, passive radar) in which the sensing transmitter does not participate in the sensing process, i.e., there is no dedicated transmitter participating in the sensing process.

Figure 6:
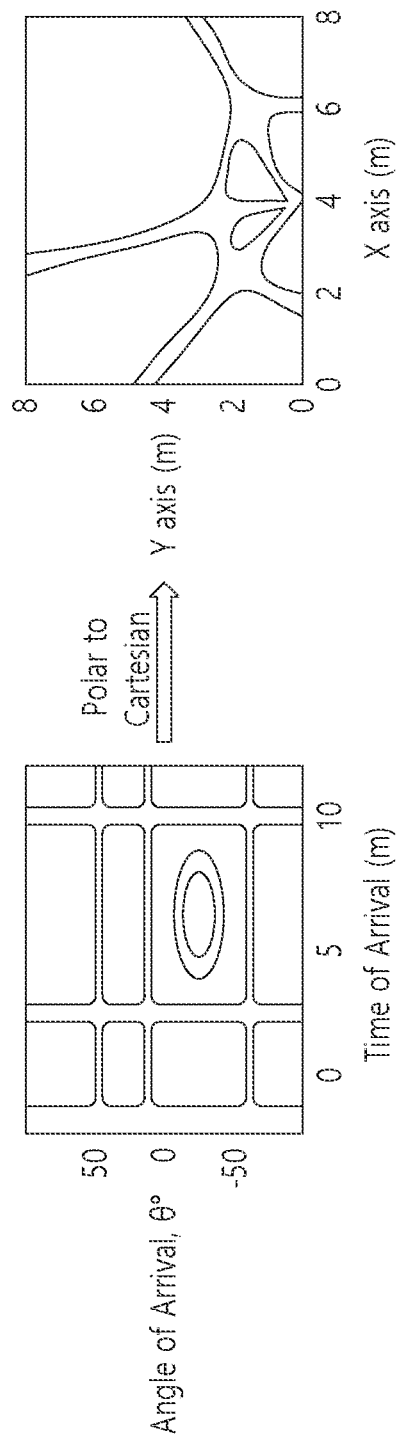
FIG. 6 illustrates indoor positioning which uses CSI-based WLAN sensing.

FIG. 6 illustrates indoor positioning which uses CSI-based WLAN sensing.

In FIG. 6, the CSI-based WLAN sensing is utilized in the indoor positioning. An angle of arrival and a time of arrival are obtained by using CSI, and then are converted into an orthogonal coordinate to obtain indoor positioning information.

Figure 7:
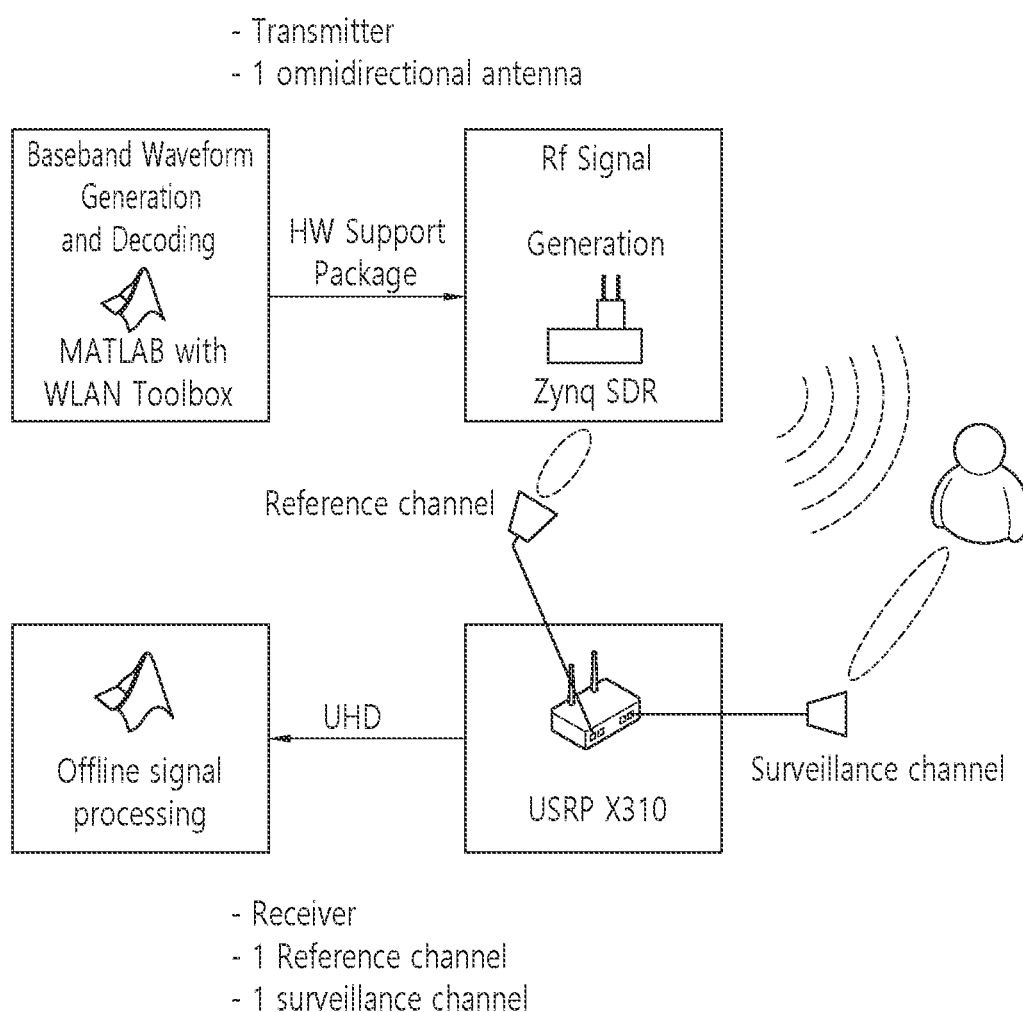
FIG. 7 is an example of implementing a WLAN sensing apparatus.

FIG. 7 is an example of implementing a WLAN sensing apparatus.

In FIG. 7, the WLAN sensing apparatus is implemented using a MATLAB toolbox, Zynq, and USRP. An IEEE 802.11ax WLAN signal is generated in the MATLAB toolbox, and an RF signal is generated using a Zynq software defined radio (SDR). A signal passing through a channel is received using a USRP SDR, and sensing signal processing is performed in the MATLAB toolbox. Herein, one reference channel (a channel which can be directly received from a sensing transmitter) and one surveillance channel (a channel which can be received by being reflected by an object) are assumed. As a result of analysis using the WLAN sensing apparatus, it is possible to obtain a unique feature capable of identifying a motion or a body action.

During its initial development phase, the current IEEE 802.11bf WLAN sensing standardization process shall handle the cooperative sensing technology, which is expected to enhance sensing accuracy in the future, as a matter of importance. The key subjects of the standardization are expected to be a synchronization technology of sensing signals for cooperative sensing, CSI management, and usage technology, sensing parameter negotiation and sharing technology, scheduling technology for CSI generation, and so on. Moreover, long-distance sensing technology, low-power sensing technology, sensing security and privacy protection technology, and so on, are also expected to be reviewed and considered as the main topics.

IEEE 802.11bf WLAN sensing is a type of radar technology that can use WLAN signals commonly existing at any time and in any place. The following table shows typical (or representative) IEEE 802.11bf usage examples. Accordingly, the IEEE 802.11bf WLAN sensing may be extensively used in our everyday lives, wherein the usage includes indoor detection, movement (or motion) detection, health care, 3D vision, various detections inside cars, and so on. Since the WLAN sensing is mostly used indoors, the motion range is within 10~20 meters, and the distance accuracy does not exceed a maximum range of 2 meters.

TABLE 2

| Name | details | Max range (m) | Key Performance Indicator | Range Accuracy (m) | Max Velocity (m/s)/Velocity Accuracy | angular Accuracy (deg) |
| --- | --- | --- | --- | --- | --- | --- |
| Room Sensing | presence detection, counting the number of people in the room | 15 | Number of Persons in Room | 0.5-2 | 2/0.1 | |
| Smart meeting room | presence detection, counting the number of people in the room, localization of active people | 10 | Location of persons in room | 0.5-2 | 1/0.1-0.3 | |

TABLE 2-continued

| Name | details | Max range (m) | Key Performance Indicator | Range Accuracy (m) | Max Velocity (m/s)/Velocity Accuracy | angular Accuracy (deg) |
|---|---|---|---|---|---|---|
| Motion detection in a room | Detection of motion of in a room (of Human) | 10 | | | | |
| Home security | Detection of presence of intruders in a home | 10 | Detection of a person in a room | 0.5-2 | 3/0.1-0.3 | medium |
| Audio with user tracking | Tracking persons in a room and pointing the sound of an audio system at those people | 6 | Localization of persons to within 0.2 m | 0.2 | 0.5/0.05 | 3 |
| Store Sensing | Counting number of people in a store, their location, speed of movement. Accuracy less important | 20 | Number and location of persons in store | 0.5-2 | 1/0.1-0.3 | 3 |
| Home Appliance Control | Tracking person and motion/gesture detection | 10 | Gesture Detection | <1 | | |
| Gesture recognition - short range (finger movement) | Identification of a gesture from a set of gestures - range < 0.5 m | 0.5 | Gesture Detection | | 7 | 3 |
| Gesture recognition - medium range (hand movement) | Indentification of a gesture from a set of gestures - range > 0.5 m | 2 | Gesture Detection | | | |
| Gesture recognition - large range (full body movement) | Indentification of a gesture from a set of gestures - range > 2 m | 7 | Gesture Detection | 0.2 | 2/0.1 | 5 |
| Aliveness detection | Determination whether a close by object is alive or not | 1 | Aliveness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care - Fall detection | Fall detection - abnormal position detection | 10 | | 0.2 | 3/0.1 | |
| Health case - remote diagnostics | measurements of breathing rate, heart rate etc. | 5 | Breating rate accuracy/Pulse Accuracy | 0.5 | 2/0.1 | |
| Surveillance/Monitoring of elder people and/or children | Tracking person and presence detection | 10 | Detection and localization of person | 0.2-2 | 3/0.1 | |
| Sneeze sensing | Detecting and localizing the target human and sneeze droplet volume | 10 | Detection and localization of person and sneeze droplet volume | 0.2-0.5 | 20/0.1 | |
| 3d vision | building a 3d picture of an environment, using multiple STA | 10 | accuracy of 3d map (range, angle) | 0.01 | 5/0.1 | 2 |
| In car sensing - detection | detection of humans in car | 5 | Presence of Human in car | 0.1 | 1/0.1 | 3 |
| In car sensing | Driver sleepiness detection/detection aid | 3 | Fast detection of driver sleepiness | 0.01 | 1/0.1 | 3 |

Figure 8:
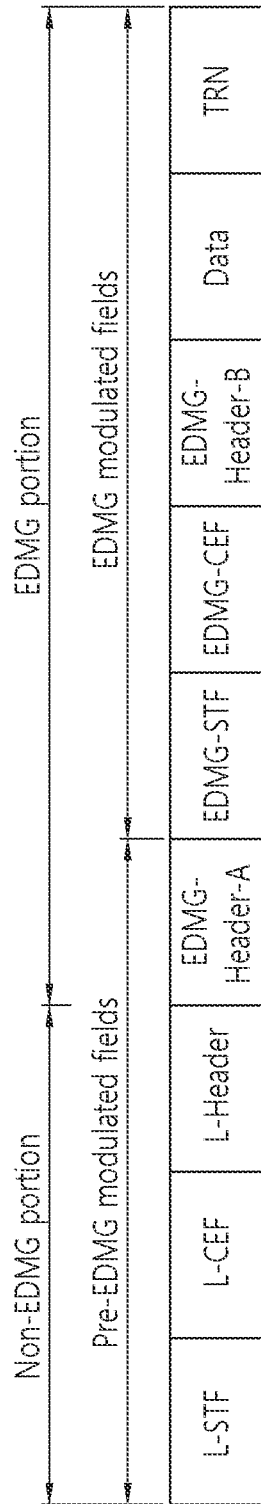
FIG. 8 is a diagram showing a simple PPDU structure that is supported in an 802.11ay WLAN system.

In IEEE 802.11, a technology for sensing a motion or gesture of an object (person or object) using a 60 GHz Wi-Fi signal (for example, 802.11ad or 802.11ay signal) is being discussed. In this specification, a method of configuring a frame format used for wi-fi sensing and a wi-fi sensing sequence are proposed. FIG. 8 is a diagram showing a simple PPDU structure that is supported in an 802.11ay WLAN system. As shown in FIG. 8, a PPDU format that is applicable to an 802.11ay system may include L-STF, L-CEF, L-Header, EDMG-Header-A, EDMG-STF, EDMG-CEF, EDMG-Header-B, Data, TRN fields, and the aforementioned fields may be optionally included in accordance with the PPDU format (e.g., SU PPDU, MU PPDU, and so on). Herein, a part including the L-STF, L-CEF, L-Header fields may be referred to as a Non-EDMG portion, and the remaining part may be referred to as an EDMG portion. Additionally, the L-STF, L-CEF, L-Header, EDMG-Header-A fields may be referred to as pre-EDMG modulated fields, and the remaining part (or fields) may be referred to as EDMG modulated fields.

The EDMG-Header-A field includes information that is required for demodulating an EDMG PPDU. The definition of the EDMG-Header-A field is the same as that of an EDMG SC mode PPDU and an EDMG OFDM mode PPDU. However, the definition of the EDMG-Header-A field is different from that of an EDMG control mode PPDU.

The structure of the EDMG-STF depends on a number of contiguous 2.16 GHZ channels through which the EDMG PPDU is transmitted and index $i_{STS}$ of an $i_{STS}$-th space-time stream. For a single space-time stream EDMG PPDU transmission using an EDMG SC mode through a single 2.16 GHz channel, the EDMG-STF field does not exist. For an EDMG SC transmission, the EDMG-STF field shall be modulated by using pi/(2-BPSK).

The structure of the EDMG-CEF depends on a number of contiguous 2.16 GHZ channels through which the EDMG PPDU is transmitted and a number of space-time streams $i_{STS}$. For a single space-time stream EDMG PPDU transmission using an EDMG SC mode through a single 2.16 GHz channel, the EDMG-CEF field does not exist. For an EDMG SC transmission, the EDMG-CEF field shall be modulated by using pi/(2-BPSK).

A (legacy) preamble part of the above-described PPDU may be used for packet detection, Automatic Gain Control (AGC), frequency offset estimation, synchronization), instruction for modulation (SC or OFDM), and channel estimation. The preamble format of the PPDU may be commonly applied to an OFDM packet and an SC packet. In this case, the preamble may be configured of a Short Training Field (STF) and a Channel Estimation (CE) field that is located after the STF.

Figure 9:
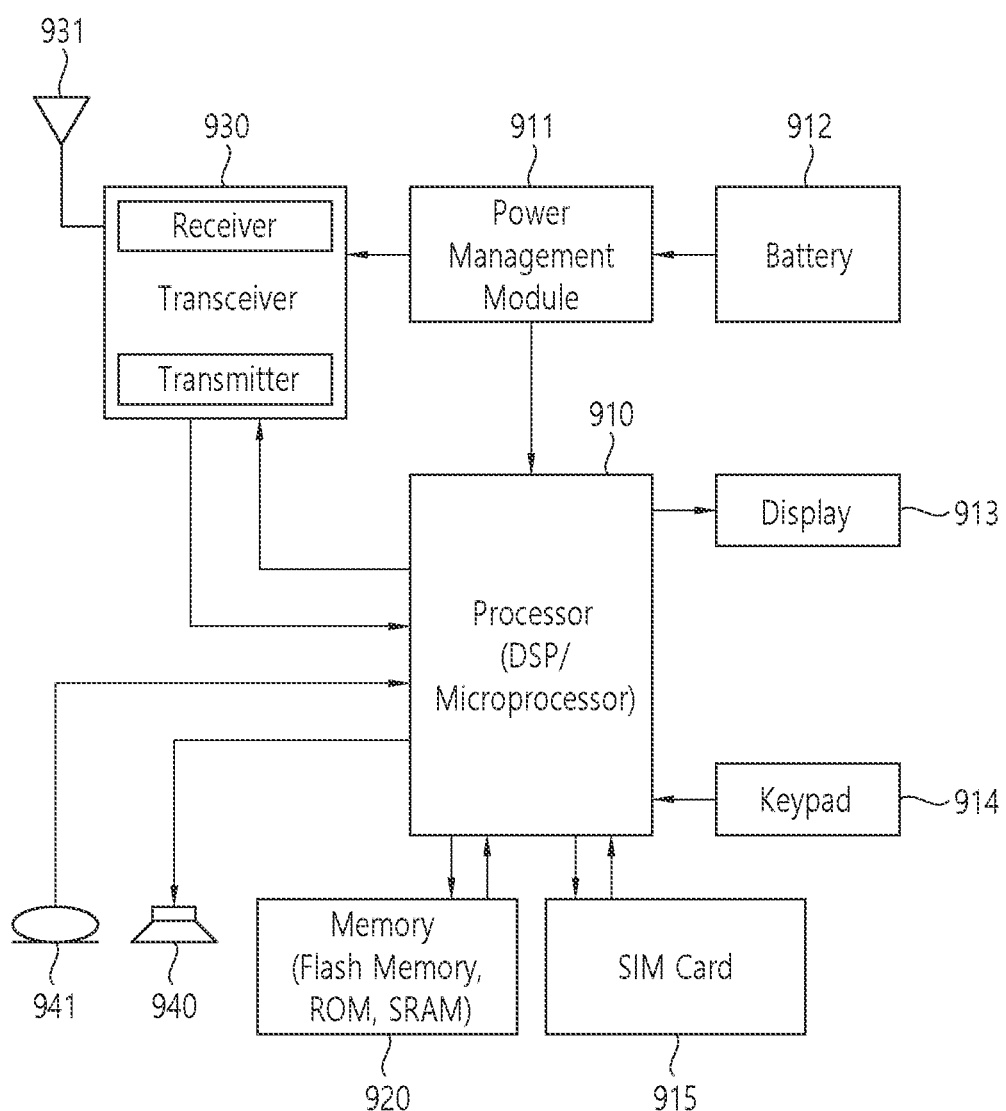
FIG. 9 illustrates an example of a PPDU used in the present specification.

FIG. 9 illustrates an example of a modified transmitting apparatus and/or receiving apparatus of the present specification.

Each apparatus/STA of the sub-figure (a)/(b) of FIG. 1 may be modified as shown in FIG. 9. A transceiver 930 of FIG. 9 may be identical to the transceivers 113 and 123 of FIG. 1. The transceiver 930 of FIG. 9 may include a receiver and a transmitter.

A processor 910 of FIG. 9 may be identical to the processors 111 and 121 of FIG. 1. Alternatively, the processor 910 of FIG. 9 may be identical to the processing chips 114 and 124 of FIG. 1.

A memory 920 of FIG. 9 may be identical to the memories 112 and 122 of FIG. 1. Alternatively, the memory 920 of FIG. 9 may be a separate external memory different from the memories 112 and 122 of FIG. 1.

Referring to FIG. 9, a power management module 911 manages power for the processor 910 and/or the transceiver 930. A battery 912 supplies power to the power management module 911. A display 913 outputs a result processed by the processor 910. A keypad 914 receives inputs to be used by the processor 910. The keypad 914 may be displayed on the display 913. A SIM card 915 may be an integrated circuit which is used to securely store an international mobile subscriber identity (IMSI) and its related key, which are used to identify and authenticate subscribers on mobile telephony apparatuses such as mobile phones and computers.

Referring to FIG. 9, a speaker 940 may output a result related to a sound processed by the processor 910. A microphone 941 may receive an input related to a sound to be used by the processor 910.

In 802.11bf, an 802.11ad and 802.11ay signal transmitting/receiving method which is a 60 GHz Wi-Fi technology is considered to sense a motion or gesture of an STA or person by using a 60 GHz Wi-Fi signal. For effective Wi-Fi sensing, the present specification proposes a method of configuring a sensing initiation frame, a transmission initiation frame, and a sensing signal, and a sensing sequence for transmitting/receiving the sensing initiation frame, the transmission initiation frame, and the sensing signal.

An STA described in the following description may be the apparatus of FIG. 1 and/or FIG. 9, and a PPDU may be the PPDU of FIG. 7. A device may be an AP or a non-AP STA.

A wireless local area network (WLAN) has been introduced for the purpose of short-distance data transmission using an unlicensed band. An IEEE 802.11 MAC/PHY-based WLAN (e.g. Wi-Fi) has become a representative technology which is at present deployed almost everywhere.

The WLAN (e.g., Wi-Fi) has been designed for data signal transmission, but its usage thereof has recently been extended for other purposes than data transmission.

A WLAN (e.g., Wi-Fi) signal transmitted from a transmitting end and delivered to a receiving end may include information on a transmission channel environment between both the transmitting and receiving ends. WLAN sensing refers to a technology which obtains recognition information for various surrounding environments by processing the transmission channel information obtained through the WLAN signal.

For example, cognitive information may include information obtained through a technology such as gesture recognition, fall detection by elder people, intrusion detection, human motion detection, health monitoring, pet movement detection, or the like.

An additional service may be provided through the recognition information, and WLAN sensing may be applied and used in various forms in daily life. As a method for increasing the accuracy of WLAN sensing, devices having at least one WLAN sensing function may be used in the WLAN sensing. The WLAN sensing using the plurality of devices may use multiple pieces of information for a channel environment, and thus may obtain more accurate sensing information, compared to a method of using one device (e.g. a transmitting/receiving end).

WLAN sensing can be performed implicitly using signals used for data transmission, but more accurate sensing can be performed by explicit request.

Additional sensing performed by an explicit request may cause additional power consumption in addition to the power consumed in data transmission. This may hinder the activation of sensing participation of devices (IoT devices, smartphones, etc.) for which power consumption is an important metric. That is, when power consumption of sensing increases, a situation in which it is difficult to perform sensing may occur in a portable device in which power saving is an important factor.

Therefore, a method to reduce power consumption during WLAN sensing is proposed below. In addition, various WLAN sensing methods that can be performed in conjunction with the method for reducing power consumption proposed in this specification are also proposed. The method described below may be useful when devices having WLAN sensing capability form a group and operate for a specific purpose.

Roles performed by STAs in WLAN sensing may be as follows.

WLAN Sensing Initiator: An station (STA) that instructs devices having one or more sensing functions (that is, WLAN Sensing responder) to initiate a sensing session using a WLAN signal. The WLAN Sensing initiator may send a signal for sensing, and may request signal transmission for sensing from other STAs.

WLAN Sensing Responder: An STA that can participate in WLAN Sensing according to the instructions of the WLAN Sensing initiator and perform the instructed sensing, deliver signals to the initiator, or transmit signals for sensing according to the instructions of the initiator.

WLAN Sensing Group Owner (GO): An STA that manages group operations when forming a group and performing WLAN sensing.

WLAN Sensing Group Member (GM): An STA that participates in WLAN sensing at the direction of the GO and plays a role in the instructed sensing.

In this specification, Group Owner and Initiator may be used interchangeably. In case of non-group-based sensing, Group Owner can be equated to Initiator.

In this specification, Group Member and Responder may be used interchangeably. In the case of non-group-based sensing, Group Members can be equated to Responders.

The sensing initiator can transmit information related to a specific band, bandwidth, and a number of transmissions used when transmitting sensing signals to sensing responders. Signals for sensing (that is, sensing signals) may be transmitted from sensing responders to sensing initiators.

Sensing responders may use a new frame or an existing frame for signal transmission. For example, a Null Data Packet (NDP) frame defined in an existing WLAN (for example, Wi-Fi) may be used as a sensing signal.

Sensing responders may inform parameters applied to the signal frame before transmitting the signal transmission frame. These parameters may contain information related to the state of the current Sensing responder that the Sensing initiator does not know about. For example, the sensing responder STA may transmit, to the sensing initiator STA, information related to transmission power according to available power, information related to how many antennas are used and how many spatial streams are used for transmission, when equipped with more than one antenna, and the like.

The state information of the sensing responder can be transmitted through a new frame or an existing frame. For example, state information of a sensing responder may be transmitted to a sensing initiator through a Null Data Packet Announcement (NDPA) frame. That is, the NDPA frame may include state information of the sensing responder.

Figure 10:
FIG. 10 is a diagram illustrating an embodiment of a connection form of WLAN sensing devices (stations).

FIG. 10 is a diagram illustrating an embodiment of a connection form of WLAN sensing devices (stations).

Referring to FIG. 10, for example, WLAN sensing devices (that is, STAs) may be connected in a point-to-point (P2P) format. The double-headed arrow indicates that information can be exchanged. That is, STA 1 and STA 2 can transmit and receive each other.

Phase 1: Setup Stage

WLAN Sensing GO can determine time information for GM to "Wake-Up" for sensing, through the negotiation with GM. The GM wake-up time can be configured differently for each GM. That is, the GM can wake up after being in the doze state in power-saving mode, the GO can determine the time information when the GM transitions from the doze state to the awake state.

Wake-up time information may include the "Wake-Up" period and duration.

The wake-up duration may refer to a time during which the GM comes out of power saving and checks whether WLAN sensing is in progress. For example, when the GM is in power-saving mode, it may not know whether WLAN sensing is in progress. When the GM is in wake-up mode, it can know whether WLAN sensing is in progress. The wake-up duration may mean the time the GM operates in wake-up mode, that is, the time interval from the time of switching from power-saving mode to wake-up mode to the time of switching to power-saving mode again.

If sensing is not initiated during the wake-up duration, the GM may enter a power-saving mode (for example, "Sleep" mode) again.

Wake-up time information may be the same as TWT (Target Wake-up Time) information designed for the purpose of reducing power consumption during data transmission, or may be additionally defined for sensing.

At the setup stage, GO and GM can determine frame transmission-related information to acquire channel information for sensing. The frame transmission-related information may include the number of transmissions of frames to be used for obtaining channel information during one sensing session.

GO and GM can conduct one or more sensing sessions during Wake-Up.

Sensing can be initiated by the GM as well as by the GO. That is, the subject of sensing initiation can be determined among GO and GM.

If the subject of sensing initiation is GM, the GO and GM can decide on the following initiation method. After Wake-Up, the GM can monitor the channel for a certain period of time. If the channel is "idle" during this time, the GM can initiate sensing.

For example, sensing by the GM may be initiated by notifying other GMs and devices not participating in the group about the use of the channel in advance. The GM can transmit a request-to-send (RTS) frame to the GO, and the GO can transmit a clear-to-send (CTS) frame to the GM.

For example, sensing by GM can be started by transmitting a frame notifying the start of sensing after channel monitoring for a certain period of time. A frame notifying the start of sensing may be a new frame or an existing frame. For example, a Null-Data Packet Announcement (NDPA) frame may be used as an existing frame.

For example, sensing by the GM may be started by transmitting a frame capable of deriving channel information to the GO after channel monitoring by the GM for a certain period of time. A frame from which channel information can be derived may be defined as a new frame, otherwise, an existing frame may be used. For example, a Null Data Packet (NDP) frame may be used as an existing frame.

WLAN Sensing GO can determine and notify time information for one or more GMs to "Wake-Up" for sensing. Time information related to wake-up can be transmitted in a broadcast or multicast method.

Wake-up time information may include the "Wake-Up" period and duration.

The wake-up duration may refer to a time during which the GM comes out of power saving and checks whether WLAN sensing is in progress. For example, when the GM is in power-saving mode, it may not know whether WLAN sensing is in progress. When the GM is in wake-up mode, it can know whether WLAN sensing is in progress. The wake-up duration may mean the time the GM operates in wake-up mode, that is, the time interval from the time of switching from power-saving mode to wake-up mode to the time of switching to power-saving mode again.

If sensing is not initiated during the wake-up duration, the GM may enter a power-saving mode (for example, "Sleep" mode) again. During the wake-up duration, GO can inform information on GMs that will participate in WLAN sensing.

Wake-up time information may be the same as TWT (Target Wake-up Time) information designed for the purpose to reduce power consumption during data transmission, or may be additionally defined for sensing.

The wake-up time information may include duration information for maintaining an awake state in which the receiving STA can monitor a signal received from the transmitting STA and period information for switching to the awake state.

That is, the transmitting STA may set up parameters related to wake-up (for example, wake-up period, wake-up duration, etc.) with one or more receiving STAs. Wakeup-related parameters set up by the transmitting STA and one or more receiving STAs may be the same or different. For example, when wakeup-related parameters set by a transmitting STA and a plurality of receiving STAs are the same, the transmitting STA may perform group-based sensing during the wake-up duration.

At the setup stage, GO and GM can determine frame transmission-related information to acquire channel information for sensing. Transmission of a frame for obtaining channel information (hereinafter, referred to as a sensing frame) may be simultaneously performed by GMs or may be performed individually. When proceeding individually, sensing participation order information can be delivered to participating GMs by GO. That is, GMs can transmit sensing frames for acquiring channel information sequentially based on sensing participation order information. The sensing participation sequence information may include the number of transmissions of sensing frames during one sensing session. That is, several sensing frames may be transmitted at once. GOs and GMs can conduct one or more sensing sessions during Wake-Up. A sensing session may refer to a cycle including the transmission of a sensing frame and a feedback frame for the sensing frame. For example, a sensing session may include the transmission of a frame indicating initiation of sensing.

Sensing can be initiated by the GM as well as by the GO. That is, the subject of sensing initiation can be determined among GO and GM.

If the subject of sensing initiation is the GM, the GO and GM can decide on the following initiation method:

If the subject of sensing initiation is GM, the GO and GM can decide on the following initiation method. After Wake-Up, the GM can monitor the channel for a certain period of time. If the channel is "idle" during this time, the GM can initiate sensing.

For example, sensing by the GM may be initiated by notifying other GMs and devices not participating in the group about the use of the channel in advance. The GM can transmit a request-to-send (RTS) frame to the GO, and the GO can transmit a clear-to-send (CTS) frame to the GM.

For example, sensing by GM can be started by transmitting a frame notifying the start of sensing after channel monitoring for a certain period of time. A frame notifying the start of sensing may be a new frame or an existing frame.

For example, a Null-Data Packet Announcement (NDPA) frame may be used as an existing frame.

For example, sensing by the GM may be started by transmitting a frame capable of deriving channel information to the GO after channel monitoring by the GM for a certain period of time. A frame from which channel information can be derived may be defined as a new frame, otherwise, an existing frame may be used. For example, a Null Data Packet (NDP) frame may be used as an existing frame.

Figure 11:
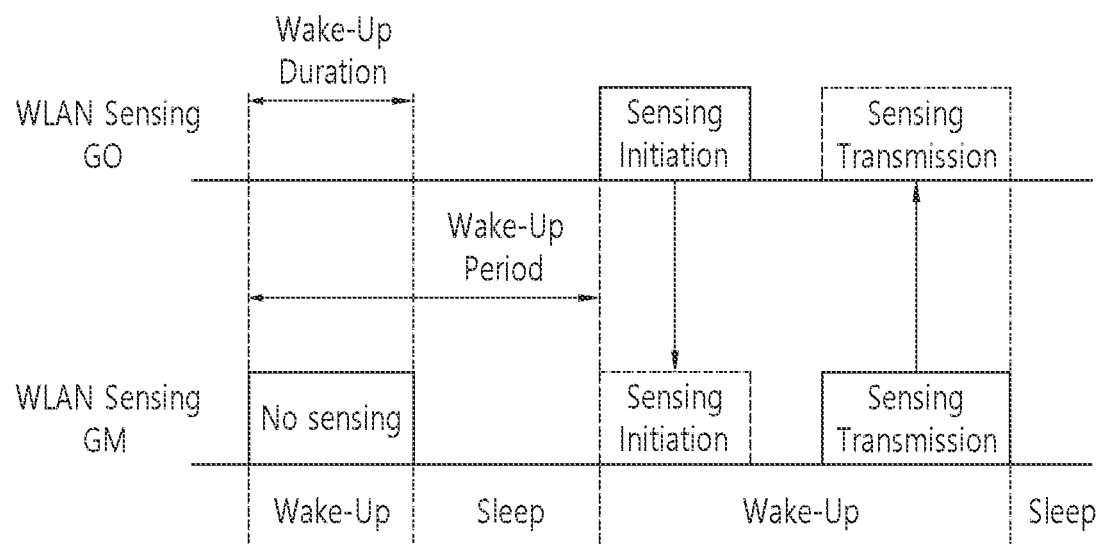
FIG. 11 is a diagram illustrating an embodiment of a WLAN sensing procedure.

FIG. 11 is a diagram illustrating an embodiment of a WLAN sensing procedure.

Referring to FIG. 11, WLAN sensing may be initiated by GO. WLAN sensing GM can repeat Wake-up and Sleep status in Power-saving mode. If the GM does not receive a sensing initiation frame from the GO during the Wake-Up duration, it can switch back to Sleep mode. The Wake-Up period may be a time period during which 2 consecutive Wake-Ups are performed by the GM. That is, the wake-up period may mean a time from the start of one wake-up duration to the start of the next wake-up duration. The Wake-Up Period and duration can be determined by the GO and GM at the Setup stage.

The GM may transmit the sensing frame upon receiving the sensing initiation frame from the GO during the wake-up duration.

Phase 2-1: Sensing Stage (Initiation of Sensing by GO)

The GO and GM may initiate sensing during the GM's "Wake-Up" duration. If sensing is not initiated during the wake-up duration, the GM may enter the power-saving mode (for example, "Sleep" mode) again.

When sensing is initiated by GO, GM can transmit information related to channel sensing to GO either explicitly or implicitly.

In the case of explicit transmission, the GO may transmit a sensing frame capable of deriving channel information to the GM. The sensing frame may be a newly defined frame, or an existing frame may be used. For example, an existing frame may be a Null-Data Packet (NDP). A sensing frame may be transmitted once or more.

The GM can derive channel information using the sensing frame received from the GO, and can transmit a feedback frame for the sensing frame to the GO after a certain time.

Figure 12:
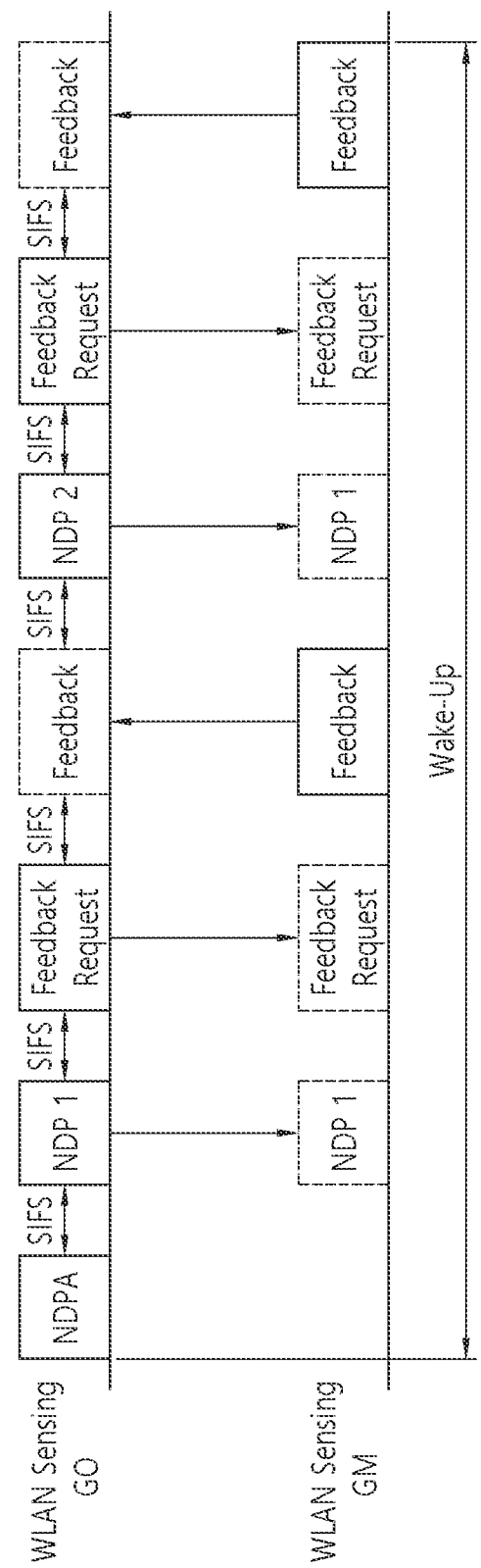
FIGS. 12 to 20 are diagrams illustrating an embodiment of a method for initiating sensing by GO.

FIG. 12 is a diagram illustrating an embodiment of a method for initiating sensing by GO.

Referring to FIG. 12, WLAN sensing GO may initiate explicit sensing. For every NDP transmission, the GO may request channel measurement information from the GM. Existing NDPA and NDP frames may be used. For example, an NDPA frame may be used as a sensing initiation frame, and an NDP frame may be used as a sensing frame. Wake-up duration may include two sensing sessions. That is, the sensing session may include NDP frame transmission, feedback request frame transmission, and feedback frame transmission.

GO can transmit NDP 1 frame after transmitting the NDPA frame to GM. Thereafter, the GO may transmit a feedback request frame to the GM. Upon receiving the feedback request frame, the GM may transmit a feedback frame including channel state information acquired based on the NDP 1 frame to the GO. GO can transmit NDP 2 frame to GM. Thereafter, the GO may transmit a feedback request frame to the GM. Upon receiving the feedback request frame, the GM may transmit a feedback frame including channel state information acquired based on the NDP 2 frame to the GO.

Figure 13:
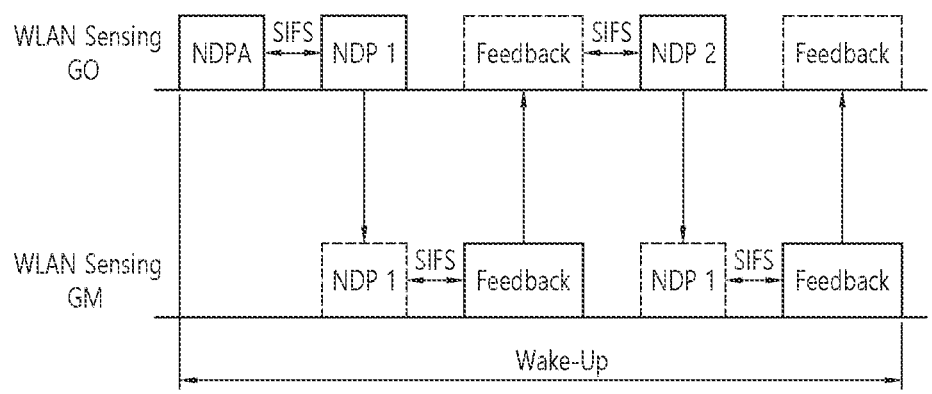

FIG. 13 is a diagram illustrating an embodiment of a method for initiating sensing by GO.

Referring to FIG. 13, WLAN sensing GO may initiate explicit sensing. GO can transmit NDPA and NDP 1 frame to GM. The GM may transmit channel measurement information (that is, feedback frame) to the GO after a specific time (for example, short interframe space (SIFS)) from the NDP 1 reception end point. That is, an NDPA frame may be used as a sensing initiation frame, and an NDP frame may be used as a sensing frame. The GO may transmit the NDP 2 frame after a specific time (for example, SIFS) from the end point of the feedback frame. The GM may transmit a feedback frame for the NDP 2 frame after a certain period of time after receiving the NDP 2 frame. For example, two sensing sessions may be included in the Wake-Up duration. For example, the sensing session may include the transmission of an NDP frame and the transmission of a feedback frame.

Figure 14:
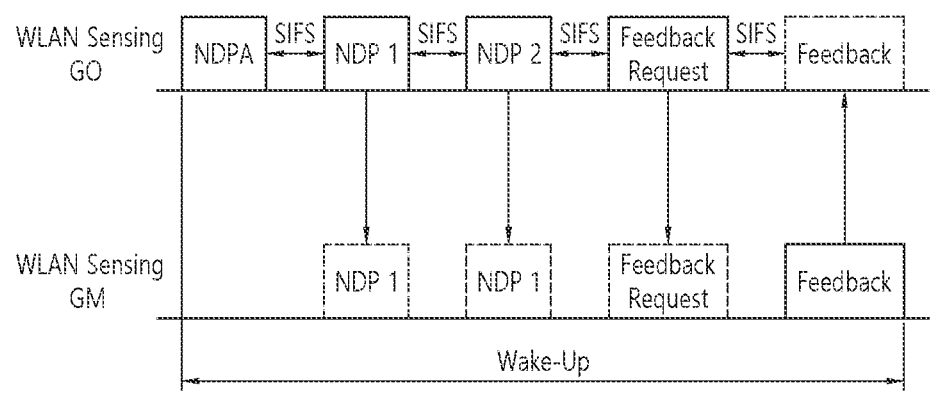

FIG. 14 is a diagram illustrating an embodiment of a method for initiating sensing by GO.

Referring to FIG. 14, WLAN sensing GO may initiate explicit sensing. After transmitting the sensing frame for channel measurement one or more times, the GO may request channel measurement information from the GM. For example, an existing NDPA may be used as a sensing initiation frame, and NDP may be used as a sensing frame. For example, two sensing sessions may be included in the Wake-Up duration. For example, a sensing session may include the transmission of an NDP frame.

Figure 15:
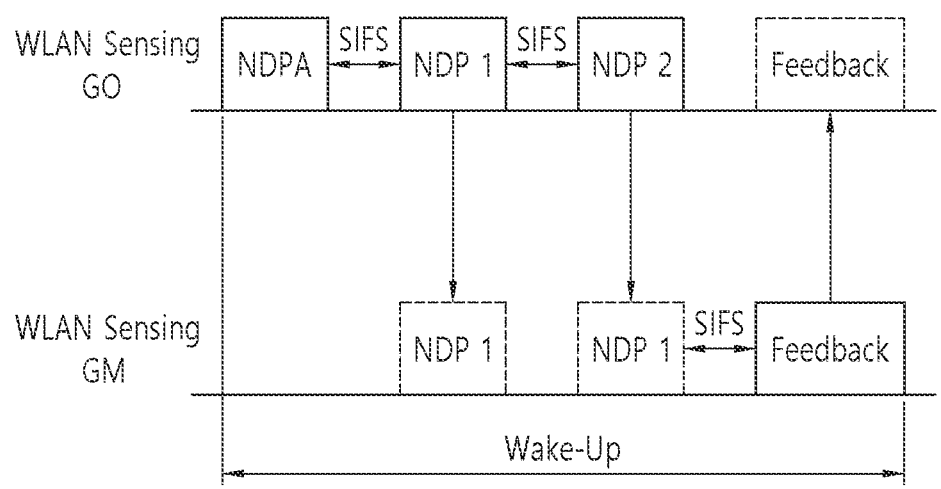

FIG. 15 is a diagram illustrating an embodiment of a method for initiating sensing by GO.

Referring to FIG. 15, WLAN sensing GO may initiate explicit sensing. The GM may transmit channel measurement information (that is, feedback frame) based on the NDP frame to the GO, after a specific time (for example, SIFS) from the end point of receiving all NDPs from the GO. For example, an existing NDPA may be used as a sensing initiation frame and an NDP frame may be used as a sensing frame. For example, two sensing sessions may be included in the Wake-Up duration. For example, a sensing session may include the transmission of an NDP frame.

Figure 16:
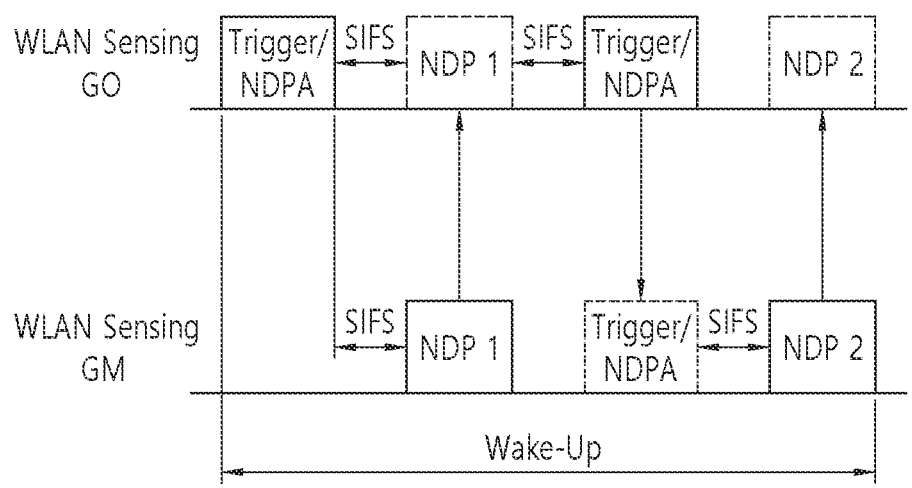

FIG. 16 is a diagram illustrating an embodiment of a method for initiating sensing by GO.

Referring to FIG. 16, the WLAN sensing GO may initiate implicit sensing. GO can transmit a Trigger frame or an NDPA frame. GM can transmit an NDP 1 frame after receiving a Trigger/NDPA. After receiving the NDP 1 frame, GO can transmit the Trigger/NDPA frame again to request additional NDP transmission from GM. GM can receive the Trigger/NDPA frame and can transmit the NDP 2 frame. For example, an existing Trigger/NDPA frame may be used as a sensing initiation frame and an NDP frame may be used as a sensing frame. For example, two sensing sessions may be included in the Wake-Up duration. For example, a sensing session may include the transmission of a trigger/NDPA frame and an NDP frame. For example, since the GO can obtain channel information based on the NDP frame when receiving the NDP frame, the feedback frame may not be transmitted. For example, the NDP frame may be a trigger-based physical protocol data unit (PPDU).

Figure 17:
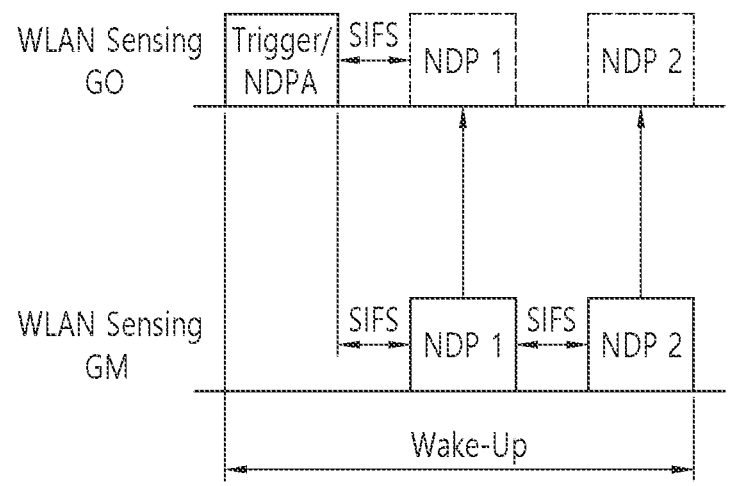

FIG. 17 is a diagram illustrating an embodiment of a method for initiating sensing by GO.

Referring to FIG. 17, the WLAN sensing GO may initiate implicit sensing. GO can initiate sensing by sending a Trigger frame or an NDPA frame. The GM can transmit a fixed number of NDPs to the GO. For example, two NDP frames (that is, NDP 1 and NDP 2) may be transmitted. For example, an existing trigger frame or an existing NDPA frame may be used as a sensing initiation frame, and an NDP may be used as a sensing frame. For example, two sensing sessions may be included in the Wake-Up duration. For example, a sensing session may include the transmission of an NDP frame. For example, since the GO can obtain channel information based on the NDP frame when receiving the NDP frame, the feedback frame may not be transmitted. For example, the NDP frame may be a trigger-based physical protocol data unit (PPDU).

Figure 18:
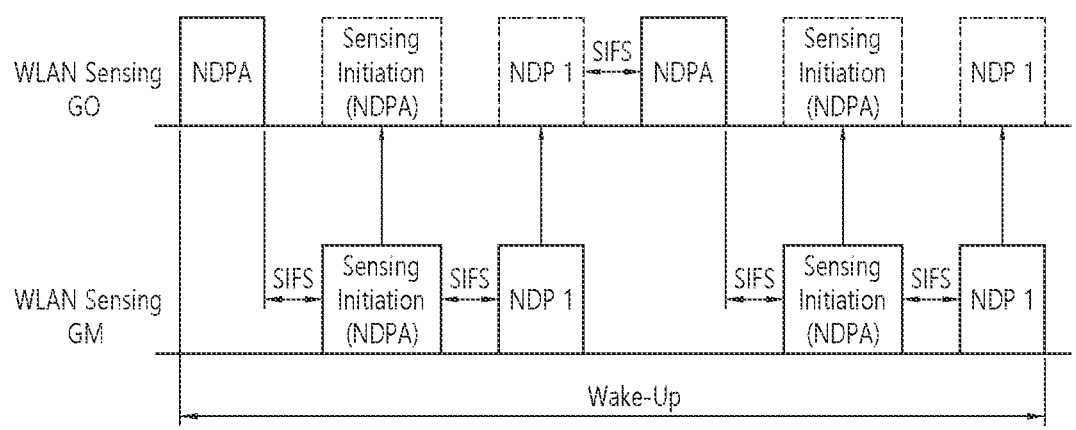

FIG. 18 is a diagram illustrating an embodiment of a method for initiating sensing by GO.

Referring to FIG. 18, the WLAN sensing GO may initiate implicit sensing. The GM may transmit an NDPA frame, and the GM may transmit the sensing initiation frame after a specific time from when NDPA reception ends. The sensing initiation frame transmitted by the GM may be, for example, an NDPA frame. After transmitting the NDPA frame, the GM may transmit an NDP 1 frame. For example, an existing NDPA frame may be used as the sensing initiation frame of the GM, and an NDP frame may be used as the sensing frame. For example, two sensing sessions may be included in the Wake-Up duration. For example, the sensing session may include the NDPA frame transmission of GO, the NDPA frame transmission of GM, and the NDP frame transmission of GM. For example, since the GO can obtain channel information based on the NDP frame when receiving the NDP frame, the feedback frame may not be transmitted.

Figure 19:
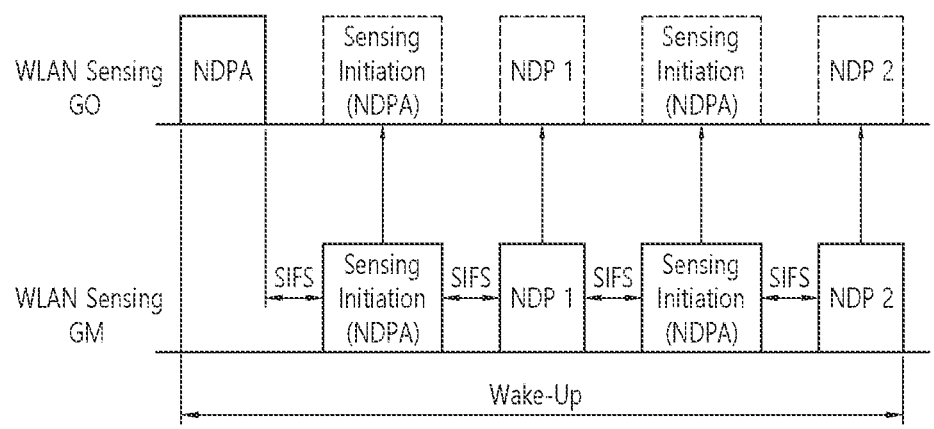

FIG. 19 is a diagram illustrating an embodiment of a method for initiating sensing by GO.

Referring to FIG. 19, the WLAN sensing GO may initiate implicit sensing. The GM may transmit an NDPA frame to initiate sensing. That is, if the sensing session has never been performed, the GO may transmit the NDPA frame. After receiving the NDPA frame from the GO, the GM may transmit the NDPA frame, which is a sensing initiation frame, to the GO. After that (for example, after SIFS), the GM may transmit the NDP 1 frame. To perform a new sensing session, the GM may transmit the NDPA frame again and may transmit the NDP 2 frame. Here, the NDPA frame by GO can be initially transmitted only once. That is, the GM may transmit a frame for session initiation to the GO before NDP transmission. A frame for sensing initiation may be a new frame or an existing defined frame (for example, an NDPA frame). For example, an existing NDPA frame may be used as a sensing initiation frame, and an NDP frame may be used as a sensing frame. For example, two sensing sessions may be included in the Wake-Up duration. For example, the sensing session may include NDP A frame transmission of GM and NDP frame transmission of GM. For example, since the GO can obtain channel information based on the NDP frame when receiving the NDP frame, the feedback frame may not be transmitted.

Figure 20:
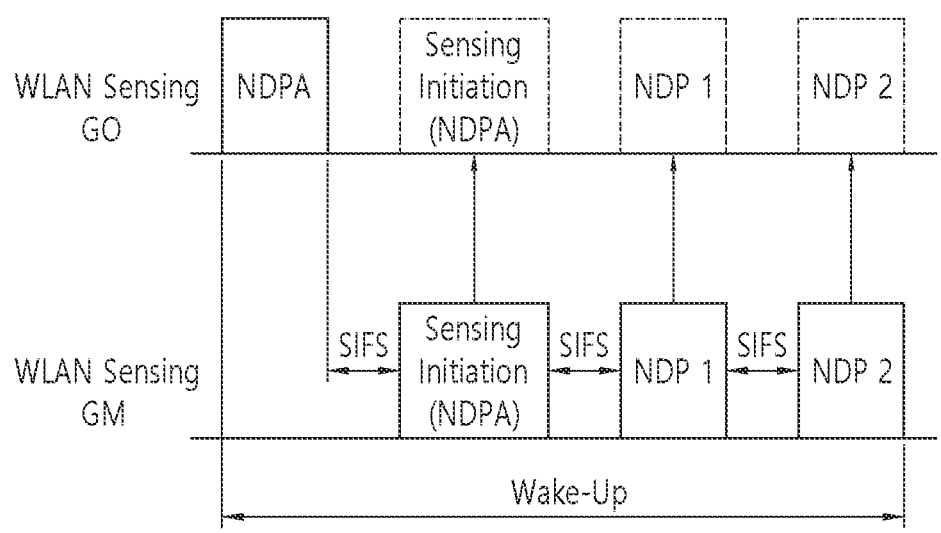

FIG. 20 is a diagram illustrating an embodiment of a method for initiating sensing by GO.

Referring to FIG. 20, the WLAN sensing GO may initiate implicit sensing. GO may transmit NDPA frames. The GM may transmit a frame for session initiation prior to NDP transmission. A frame for initiating sensing may be a new frame or an existing defined frame (for example, an NDPA frame). After transmitting the NDPA frame, the GM may transmit NDP 1 frame and NDP 2 frame consecutively. For example, an existing NDPA frame may be used as a sensing initiation frame and an NDP frame may be used as a sensing frame. For example, two sensing sessions may be included in the Wake-Up duration. For example, the sensing session may include NDP frame transmission of GM. For example, since the GO can obtain channel information based on the NDP frame when receiving the NDP frame, the feedback frame may not be transmitted.

Phase 2-2: Sensing Stage (Initiation of Sensing by GM)

If the subject of sensing initiation is GM, GM may initiate sensing through the following initiation methods:

The GM can monitor the channel for a period of time after Wake-Up. If the channel is "idle" for a period of time, the GM can initiate sensing.

For example, sensing by the GM may be initiated by notifying other GMs and devices not participating in the group about the use of the channel in advance. The GM can transmit a request-to-send (RTS) frame to the GO, and the GO can transmit a clear-to-send (CTS) frame to the GM.

For example, sensing by the GM may be initiated by transmission of a frame notifying the start of sensing (for example, sensing initiation frame) after channel monitoring for a certain period of time. The sensing initiation frame may be a new frame or an existing frame. An example of an existing frame may include a Null-Data Packet Announcement (NDPA).

For example, sensing by the GM may be started by transmitting a sensing frame capable of deriving channel information to the GO after channel monitoring by the GM for a certain period of time. The sensing frame may be defined as a new frame, otherwise, an existing frame may be used. An existing frame may include a Null Data Packet (NDP).

Figure 21:
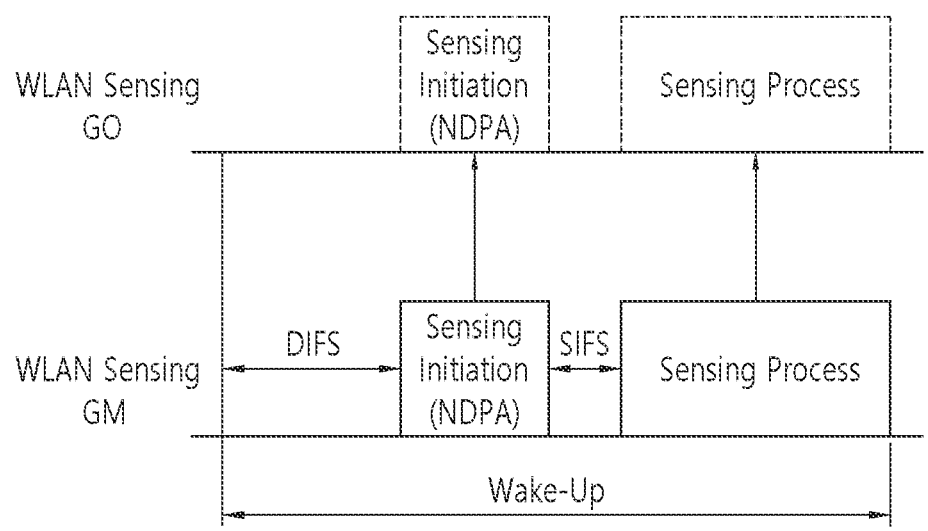
FIGS. 21 to 24 are diagrams illustrating an embodiment of a method for initiating sensing by GM.

FIG. 21 is a diagram illustrating an embodiment of a method for initiating sensing by GM.

Referring to FIG. 21, WLAN sensing may be initiated by the GM. Channel information can be transmitted implicitly by the GM to the GO. After the GM monitors the channel for a certain period of time (e.g., Distributed Coordination Function (DCF) Inter-Frame Space (DIFS)) after Wake-Up, if the channel is "idle", it can initiate sensing by transmitting a sensing initiation frame. Sensing can be performed through various methods during the sensing process. For example, the sensing process may include the methods described in the implicit sensing initiated by the WLAN sensing GO in FIGS. 16 to 20.

Figure 22:
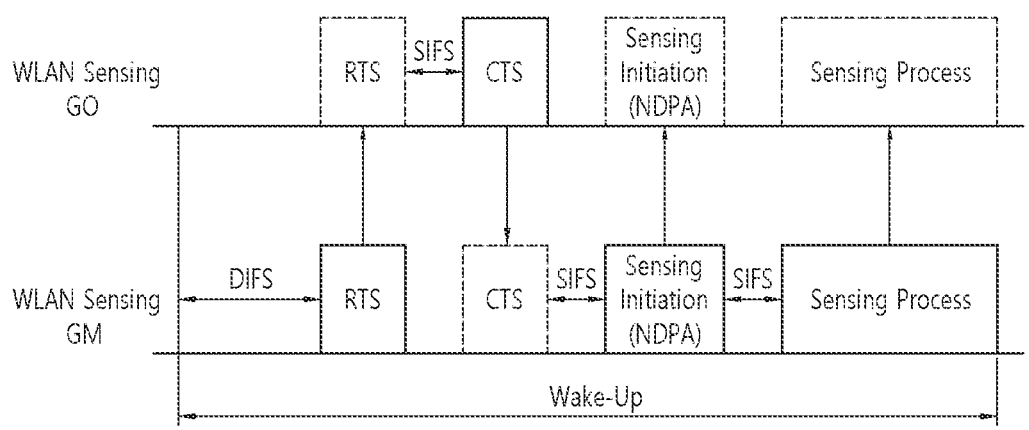

FIG. 22 is a diagram illustrating an embodiment of a method for initiating sensing by GM.

Referring to FIG. 22, WLAN sensing may be initiated by the GM. Channel information (that is, sensing frame) may be implicitly transmitted by the GM to the GO. After the GM monitors the channel for a certain period of time (for example, DIFS) after Wake-Up, if the channel is "Idle", it can exchange RTS and CTS frames. After this, the GM can notify the start of sensing by transmitting the sensing initiation frame. Sensing can be performed through various methods during the sensing process. For example, the sensing process may include the methods described in the implicit sensing initiated by the WLAN sensing GO in FIGS. 16 to 20.

Figure 23:
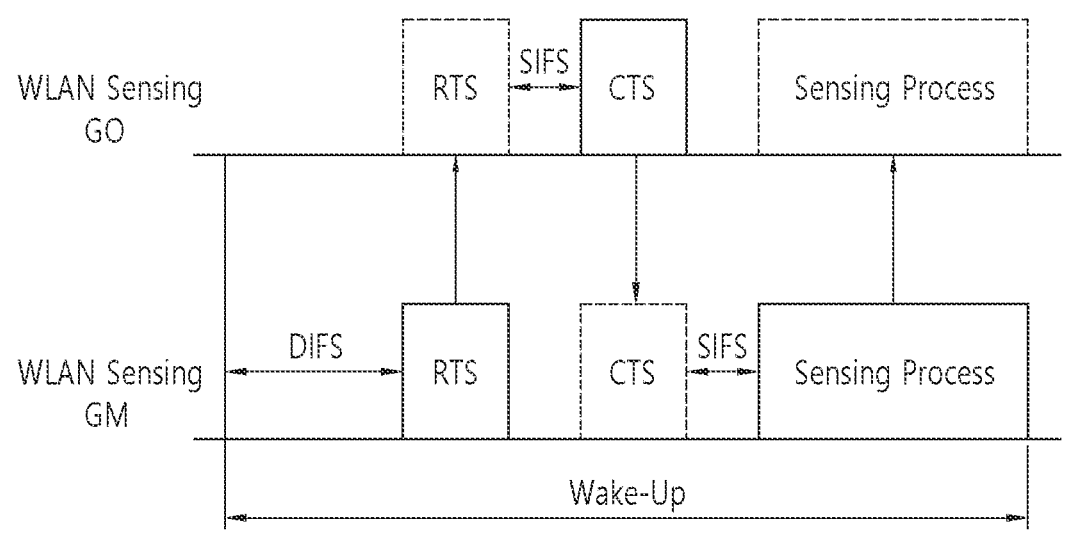

FIG. 23 is a diagram showing an embodiment of a sensing initiation method by GM.

Referring to FIG. 23, WLAN sensing may be initiated by the GM. Channel information (for example, sensing frame) may be implicitly transmitted by the GM to the GO. After the GM monitors the channel for a certain period of time (for example, DIFS) after Wake-Up, if the channel is "Idle", it can exchange RTS and CTS frames. After this, sensing by the GM may be initiated. The first transmission of the sensing process may be an NDP frame (that is, the NDPA frame may not be transmitted). Sensing can be performed through various methods during the sensing process. For example, the sensing process may include the methods described in the implicit sensing initiated by the WLAN sensing GO in FIGS. 16 to 20.

Figure 24:
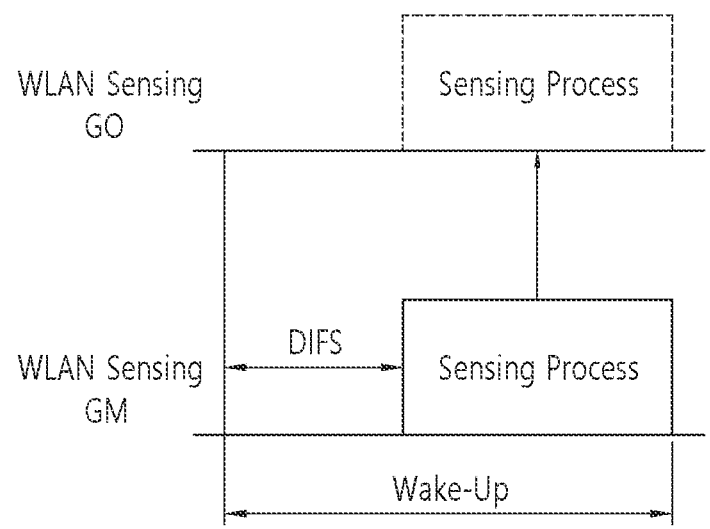

FIG. 24 is a diagram illustrating an embodiment of a method for initiating sensing by GM.

Referring to FIG. 24, WLAN sensing may be initiated by the GM. Channel information (for example, sensing frame) may be implicitly transmitted by the GM to the GO. The GM can initiate sensing when the channel is "idle" after monitoring the channel for a certain period of time (for example, DIFS) after Wake-Up. The first transmission of the sensing process may be NDP (that is, NDPA frames may not be transmitted). Sensing can be performed through various methods during the sensing process. For example, the sensing process may include the methods described in the implicit sensing initiated by the WLAN sensing GO in FIGS. 16 to 20.

WLAN sensing can introduce additional power consumption in addition to conventional data transmission. Using at least one method described in this specification, it is possible to reduce power loss that can be consumed by WLAN sensing. In addition, this specification includes various WLAN sensing methods that can be performed in conjunction with the proposed method. That is, the embodiments described above may be implemented in combination with each other.

Figure 25:
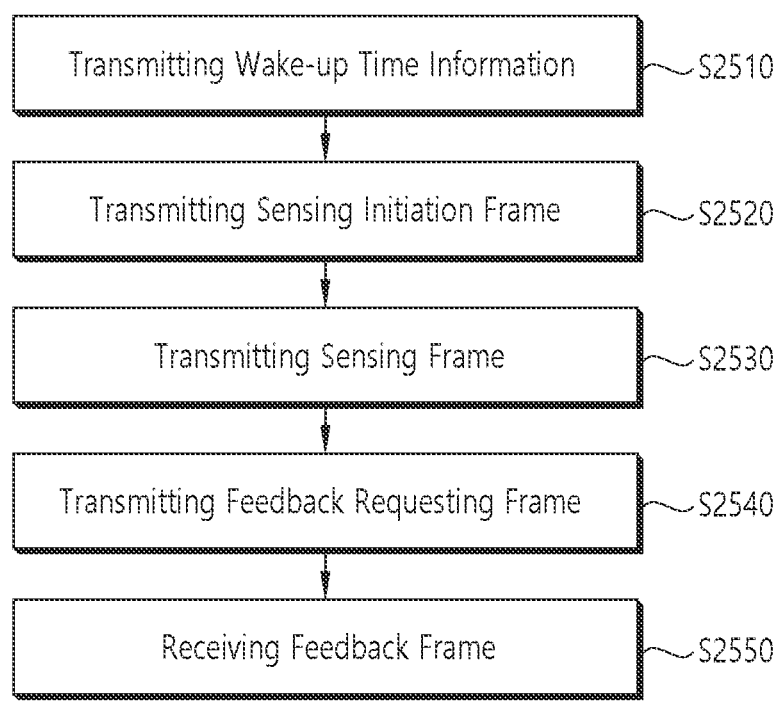
FIG. 25 is a diagram illustrating an embodiment of a method for operating a transmitting STA.

FIG. 25 is a diagram illustrating an embodiment of a method for operating a transmitting STA.

Referring to FIG. 25, a transmitting STA operation may be based on technical features described in at least one of FIGS. 1 to 24.

The transmitting STA may transmit wake-up time information (S2510). For example, the transmitting STA may transmit, to the receiving STA, wake-up time information related to the receiving STA.

For example, the wake-up time information may include duration information for maintaining an awake state in which the receiving STA can monitor a signal received from the transmitting STA and period information for switching to the awake state.

That is, the transmitting STA may set up parameters related to wake-up (for example, wake-up period, wake-up duration, etc.) with one or more receiving STAs. Wakeup-related parameters set up by the transmitting STA and one or more receiving STAs may be the same or different. For example, when wakeup-related parameters set by a transmitting STA and a plurality of receiving STAs are the same, the transmitting STA may perform group-based sensing during the wake-up duration.

The transmitting STA may transmit a sensing initiation frame (S2520). For example, the transmitting STA may transmit a sensing initiation frame to the receiving STA.

For example, the sensing initiation frame may include information related to a subject transmitting the sensing frame.

For example, the sensing initiation frame may include information related to a number of transmissions of the sensing frame.

The transmitting STA may transmit a sensing frame (S2530). For example, the transmitting STA may transmit a sensing frame to the receiving STA.

For example, the sensing initiation frame may include a null data packet announcement (NDPA) frame, and the sensing frame may include a null data packet (NDP) frame.

The transmitting STA may transmit a feedback requesting frame (S2540). For example, the transmitting STA may transmit a feedback requesting frame for the sensing frame to the receiving STA.

The transmitting STA may receive a feedback frame (S2550). For example, the transmitting STA may receive a feedback frame for the sensing frame from the receiving STA.

For example, the feedback frame may include channel state information obtained based on the sensing frame.

For example, a sensing session may include operations of transmitting the sensing frame, transmitting the frame requesting the feedback, and receiving the feedback frame, and the sensing initiation frame may include information related to a number of times the sensing session is performed.

Figure 26:
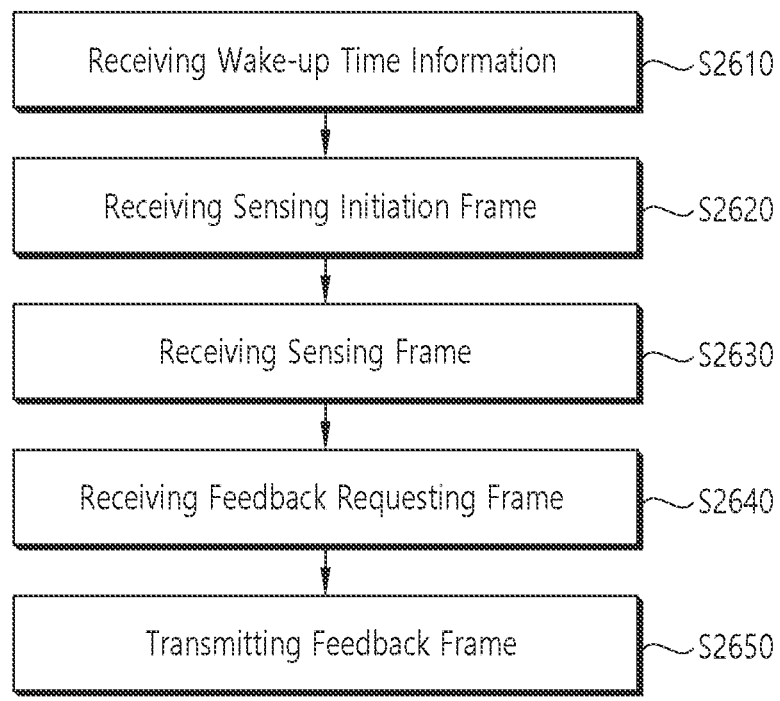
FIG. 26 is a diagram illustrating an embodiment of a method of operating a receiving STA.

FIG. 26 is a diagram illustrating an embodiment of a method of operating a receiving STA.

Referring to FIG. 26, a receiving STA operation may be based on technical features described in at least one of FIGS. 1 to 24.

The receiving STA may receive wake-up time information (S2610). For example, the receiving STA may receive, from the transmitting STA, wake-up time information related to the receiving STA.

For example, the wake-up time information may include duration information for maintaining an awake state in which the receiving STA can monitor a signal received from the transmitting STA and period information for switching to the awake state.

That is, the transmitting STA may set up parameters related to wake-up (for example, wake-up period, wake-up duration, etc.) with one or more receiving STAs. Wakeup-related parameters set up by the transmitting STA and one or more receiving STAs may be the same or different. For example, when wakeup-related parameters set by a transmitting STA and a plurality of receiving STAs are the same, the transmitting STA may perform group-based sensing during the wake-up duration.

The receiving STA may receive the sensing initiation frame (S2620). For example, the receiving STA may receive a sensing initiation frame from the transmitting STA.

For example, the sensing initiation frame may include information related to a subject transmitting the sensing frame.

For example, the sensing initiation frame may include information related to a number of transmissions of the sensing frame.

The receiving STA may receive the sensing frame (S2630). For example, the receiving STA may transmit a sensing frame from the transmitting STA.

For example, the sensing initiation frame may include a null data packet announcement (NDPA) frame, and the sensing frame may include a null data packet (NDP) frame.

The receiving STA may receive a feedback requesting frame (S2640). For example, the receiving STA may transmit a feedback requesting frame for the sensing frame from the transmitting STA.

The receiving STA may transmit a feedback frame (S2650). For example, the receiving STA may transmit a feedback frame for the sensing frame to the transmitting STA.

For example, the feedback frame may include channel state information obtained based on the sensing frame.

For example, a sensing session may include operations of transmitting the sensing frame, transmitting the frame requesting the feedback, and receiving the feedback frame, and the sensing initiation frame may include information related to a number of times the sensing session is performed.

Some of detailed steps shown in the example of FIG. 25 and FIG. 26 may not be essential steps and may be omitted. Other steps may be added in addition to the steps shown in FIG. 25 and FIG. 26, and orders of the steps may vary. Some steps the above steps may have independent technical meaning.

The aforementioned technical feature of the present specification may be applied to various apparatuses and methods. For example, the aforementioned technical feature of the present specification may be performed/supported through the apparatus of FIG. 1 and/or FIG. 9. For example, the aforementioned technical feature of the present specification may be applied only to part of FIG. 1 and/or FIG. 9. For example, the aforementioned technical feature of the present specification may be implemented based on the processing chips 114 and 124 of FIG. 1, or may be implemented based on the processors 111 and 121 and memories 112 and 122 of FIG. 1, or may be implemented based on the processor 910 and memory 920 of FIG. 9. For example, the apparatus of the present specification includes: a memory; and a processor operatively coupled to the memory. The processor may be configured to: transmit, to a receiving STA, wake-up time information related to the receiving STA; transmit, to the receiving STA, a sensing initiation frame; transmit, to the receiving STA, a sensing frame; transmit, to the receiving STA, a feedback requesting frame for the sensing frame; and receive, from the receiving STA, a feedback frame for the sensing frame.

The technical feature of the present specification may be implemented based on a computer readable medium (CRM). For example, the CRM proposed by the present specification is at least one computer readable medium having an instruction executed by at least one processor of an initiator station (STA) of a wireless local area network (WLAN) system to perform an operation comprising: transmitting, to a receiving STA, wake-up time information related to the receiving STA; transmitting, to the receiving STA, a sensing initiation frame; transmitting, to the receiving STA, a sensing frame; transmitting, to the receiving STA, a feedback requesting frame for the sensing frame; and receiving, from the receiving STA, a feedback frame for the sensing frame.

Instructions stored in a CRM of the present specification may be executed by at least one processor. The at least one processor related to the CRM of the present specification may be the processors 111 and 121 or processing chips 114 and 124 of FIG. 1 or the processor 910 of FIG. 9. Meanwhile, the CRM of the present specification may be the memories 112 and 122 of FIG. 1 or the memory 920 of FIG. 9 or a separate external memory/storage medium/disk or the like.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problemsolving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a transmitting station (STA) in a wireless local area network (WLAN) system, the method comprising:
    transmitting, to a receiving STA, wake-up time information related to the receiving STA, wherein the wake-up time information includes duration information related to a wake-up duration for maintaining an awake state;
    during the wake-up duration, transmitting, to the receiving STA, a null data packet announcement (NDPA) frame including sensing frame information related to a number of null data packet (NDP) frames;
    in response to the NDPA frame, receiving from the receiving STA, a plurality of NDP frames based on the sensing frame information, wherein an inter frame space (IFS) between the plurality of NDP frames is set to a short IFS (SIFS); and
    obtaining channel information between transmitting STA and the receiving STA based on the plurality of NDP frames.

2. The method of claim 1, wherein the transmitting STA obtains the channel information without transmitting a feedback request to the receiving STA.

3. The method of claim 1, wherein the transmitting STA obtains the channel information without receiving channel feedback information from the receiving STA.

4. The method of claim 1, wherein the plurality of NDP frames are received on a 60 GHz band.

5. A transmitting station (STA) in a wireless local area network (WLAN) system, the transmitting STA comprising:
    at least one processor; and
    at least one non-transitory computer memory operatively connected to the at least one processor and storing instructions that, based on being executed by the at least one processor, perform operations comprising:
    transmitting, to a receiving STA, wake-up time information related to the receiving STA, wherein the wake-up time information includes duration information related to a wake-up duration for maintaining an awake state;
    during the wake-up duration, transmitting, to the receiving STA, a null data packet announcement (NDPA) frame including sensing frame information related to a number of null data packet (NDP) frames;

in response to the NDPA frame, receiving from the receiving STA, a plurality of NDP frames based on the sensing frame information, wherein an inter frame space (IFS) between the plurality of NDP frames is set to a short IFS (SIFS); and obtaining channel information between transmitting STA and the receiving STA based on the plurality of NDP frames.

6. The transmitting STA of claim 5, wherein the transmitting STA obtains the channel information without transmitting a feedback request to the receiving STA.

7. The transmitting STA of claim 5, wherein the transmitting STA obtains the channel information without receiving channel feedback information from the receiving STA.

8. The transmitting STA of claim 5, wherein the plurality of NDP frames are received on a 60 GHz band.

* * * * *